April 15, 1930.                C. PASSEGA                1,754,569
                        TRACTION DEVICE FOR WHEELS
                     Filed Aug. 21, 1925    2 Sheets-Sheet 1
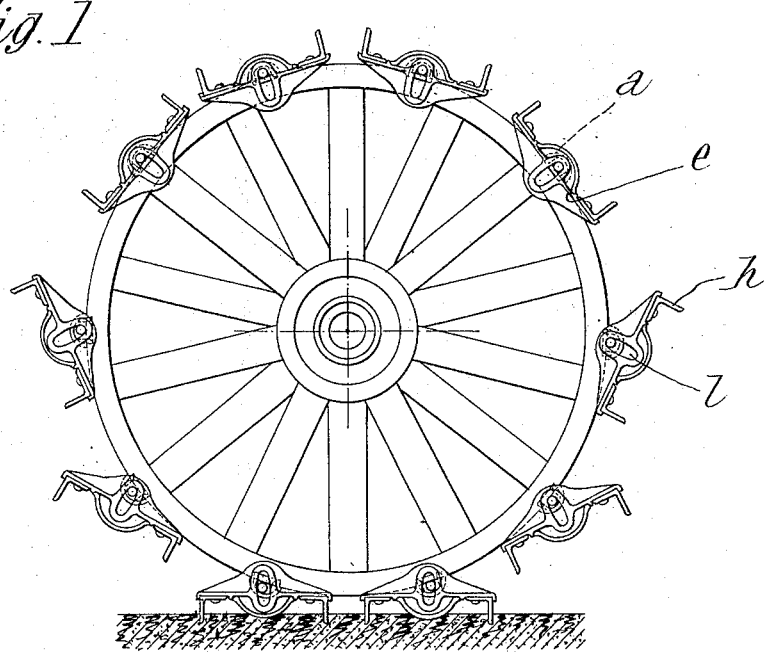
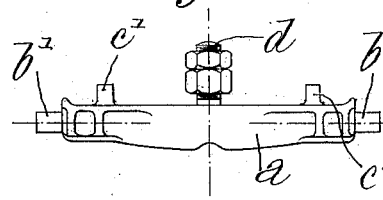 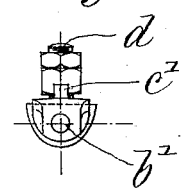
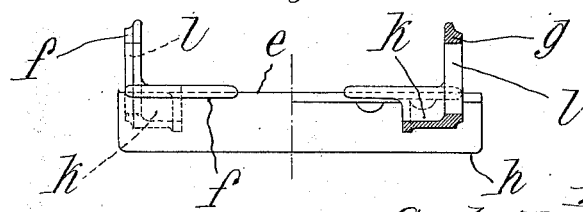
Inventor
Carlo Passega
By
Attorney April 15, 1930.  C. PASSEGA  1,754,569
TRACTION DEVICE FOR WHEELS
Filed Aug. 21, 1925  2 Sheets-Sheet 2
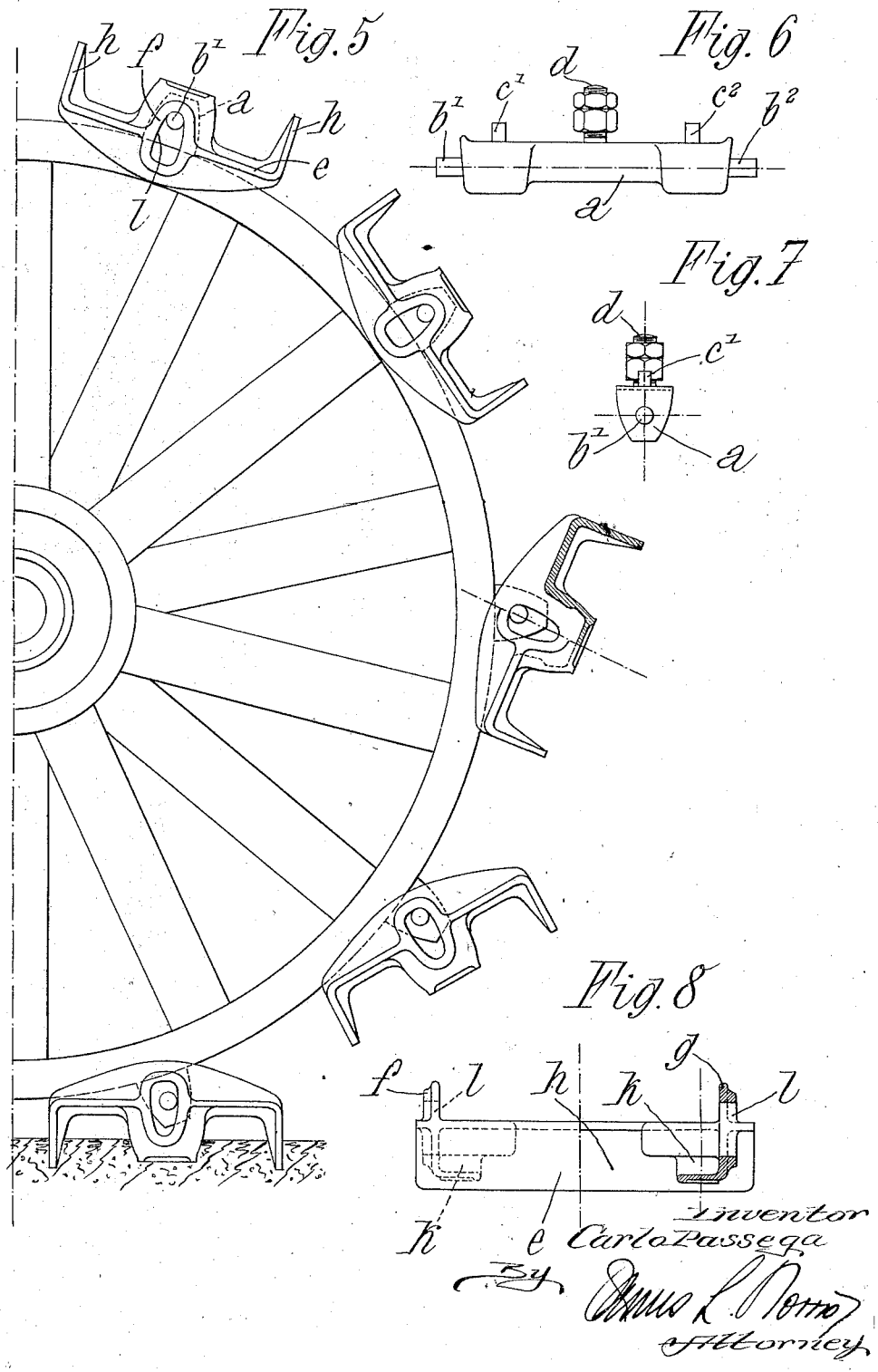

Patented Apr. 15, 1930

1,754,569

UNITED STATES PATENT OFFICE

CARLO PASSEGA, OF PARIS, FRANCE

TRACTION DEVICE FOR WHEELS

Application filed August 21, 1925, Serial No. 51,659, and in Belgium December 2, 1924.

This invention relates to wheels for vehicles, especially to wheels for tractors, and refers more particularly to traction devices of the type described in the Guerrini patents, filed in Italy on 16th April, 1918, and in Belgium on 21st February, 1920.

As regards the first of these patents, that is to say the Italian patent of 16th April, 1918, it relates to an adhesion device adapted to be applied to wheels provided with solid or pneumatic rubber tyres. It comprises a belt stretched over the said tyres, from which belt is suspended a series of shoes by means, on the one hand, of mixtilinear triangular shaped holes made in lateral ears of said shoes and, on the other hand, of pins connected to blocks forming a part of the belt and clamped by means of this latter to the tyres.

The second of the before mentioned patents, that is the Belgian patent dated 21st February, 1920, relates to wheels with rigid rim provided with shoes analogous to those described in the before mentioned Italian patent, but suspended directly from the rim by means of coupling arrangements including pins and holes of mixtilinear triangular shape analogous to those specified in the said Italian patent. In the said Belgian patent and in other analogous patents having wheels made according to the well known principle of suspending shoes loosely to a wheel with a rigid rim so as to allow the shoes to come freely into contact with the ground and to be freely raised up from the ground and to also allow the wheel itself to be in gear with the shoes which come into contact with the ground in front of the wheel, the pins and holes in which the pins operate are such that, for the shoes resting on the ground at any particular moment, the point of contact between the pins and the corresponding holes is always above the actual rolling surface of the wheel on the shoes. In other words, heretofore the pins or the holes carried by the rim have been always at a distance from the axis of rotation of the wheel which was less than the radius of the wheel.

This arrangement of pins and holes, with respect to the rolling surface, possesses the drawback that it is not possible to provide such a profile or outline for the holes that the rolling of the wheel on the inner surface of the shoes can take place without slipping or sliding when the pins are displaced against and along the outline of the holes in which they are engaged.

The present invention has for its object to eliminate the said drawback by ensuring a better and theoretically perfect gearing of the pins in the corresponding holes to diminish the mutual wear of the pins against the walls of said holes, and to make it possible to more easily and rapidly apply the traction device to and remove it from a wheel.

It consists chiefly—in addition to providing couplings including pins and holes for suspending the shoes from rigid rims of wheels—in providing means for preventing undue wear of the pins and the walls of the holes and in so locating these suspension pins that they are at a distance from the axis of rotation of the wheel which is at least equal to the radius of the running surface of the wheel itself.

The invention includes, in addition to the foregoing principal feature, certain other features which are preferably utilized at the same time and which will be described more fully hereafter.

It embraces more especially certain constructional embodiments and applications of its principles, and includes, as new industrial prdoucts, wheels of the class in question provided with the said arrangements as well as special parts suitable for their construction.

The invention will be understood from the accompanying description, which, as well as the annexed drawings, is given merely by way of example since the invention is not intended to be limited to the precise details of construction and arrangement shown.

Fig. 1 of the drawing is a front elevation of a wheel provided with a traction device embodying the invention.

Figs. 2 and 3 are, respectively, a front elevation and a side elevation of one of the suspension blocks for the shoes.

Fig. 4 is a side view, partly in section and partly in elevation of one of the shoes with which the wheel shown in Fig. 1 is provided.

Fig. 5 is a partial front elevation of another wheel provided with a modified form of traction devices embodying the invention drawn to a larger scale.

Figs. 6 and 7 are views, similar to Figs. 2 and 3 of a suspension block for the traction device shown in Fig. 5.

Fig. 8 is a view partly in section, and partly in side elevation, of one of the traction shoes with which the wheel shown at Fig. 5 is provided.

According to the invention and more particularly according to those constructional embodiments thereof shown in the drawings, the following or some analogous procedure is adopted.

A plurality of suspension blocks $a$ are provided each of which is constituted by a rigid member of appropriate shape and of a length corresponding approximately to the width of the rim of the wheel to which it is to be attached. Each block is provided at each of its extremities with a pin $b^1$ or $b^2$ for lateral suspension of the shoes. Perpendicular to these pins on the inner surface of the block, are two projecting tenons $c^1$ and $c^2$, and, midway between the latter, a threaded rod or bolt $d$.

For the purpose of fastening these blocks to the rim of the wheel, there are provided in an appropriate manner at equal distances apart in the periphery of the rim, sets of three holes each into which the tenons $c^1$ and $c^2$ and the bolt $d$ of each block are adapted to enter. The blocks can thus be applied on the external surface of the rim and be held in position by engagment of the tenons $c^1$ and $c^2$ with the holes in the rim. All tangential movement of the block with respect to the rim, is thus prevented, and the blocks are held against removal from the rim by screwing nuts upon the bolts $d$ against the inner surface of the rim.

To each block is loosely suspended a shoe $e$.

The shoes $e$ are each formed with a pair of lateral flanges $f$ and $g$, parallel to one another, and at a distance apart which is slightly greater than the width of the rim and connected by transverse members $h$ adapted to secure the necessary traction with the ground, and to afford a sufficiently large bearing surface on the ground. These members $h$ may be provided with rubber or other elastic parts in order to obtain more elasticity for the rolling of the wheel. Each of the lateral flanges $f$ and $g$ has a base member extending at a right angle thereto, the base member of the lateral flange $f$ being directed toward that of the flange $g$, and each of said base members is formed with a cavity $k$, each of which cavities is adapted to receive an extremity of one of the suspension blocks $a$ without interfering with the movement of the traction shoe during the rolling of the wheel as such movement displaces the block with respect to the corresponding shoe. The corresponding transverse sections of the inner surfaces of the cavity $k$ and of the exterior surfaces of the extremities of the block $a$ are advantageously shaped according to corresponding or conjugate curves, that is to say, curves permitting sliding contact between the inner surfaces of cavities $k$ and the exterior faces of the block engaging therein, while, simultaneously, sliding contact of pins $b^1$ and $b^2$, with the walls of the holes in flanges $f$, $g$ is taking place. Supplementary gearing is thus provided between the rigidly secured blocks and shoes suspended therefrom and the frictional wear on the elements constituting the pin suspension is substantially arrested as soon as said wear becomes sufficiently extended to counterbalance the play existing between cavities $k$ and the block surfaces meshing therein. The holes $l$ formed in the two flanges $f$ and $g$ of the shoes are preferably of elongated shape, bounded laterally by cycloidal curves. The shape of the holes $l$ into which the pins $b^1$ and $b^2$ extend is such that when any particular shoe is applied to the ground the wheel can roll over such shoe without sliding and pass forwards or backwards over each of the two adjacent shoes, without the said intermediate shoe changing its position with respect to the ground and while the pins $b^1$ and $b^2$ ride in and move along in the holes $l$ while bearing constantly on the walls of said holes. The holes $l$ are consequently shaped according to the curve tangential to the successive positions taken by the pins $b^1$ and $b^2$ during the rolling without slipping of the wheel.

There is, consequently, a definite relation between the distance of the pins from the axis of rotation of the wheel and the shape of the holes. According to Figs. 1 to 4, pins $b^1$, $b^2$ of blocks $a$ are attached to said blocks so that, when the latter are mounted on the wheel rim, the axes of said pins are nearer to the axis of rotation of the wheel than are the axes of the corresponding pins $b^1$, $b^2$ of the blocks $a$ shown in Figs. 5 to 8. The maximum width of holes $l$, shown in Figs. 5 to 8, at their upper extremities must be made greater than the corresponding dimension of the holes $l$ shown in Figs. 1 to 4.

The blocks $a$ shown in Figs. 1 to 4 are approximately semicircular in form adjacent their ends, the corresponding cavities $k$ being of like shape but with a greater radius of curvature. The blocks $a$ and cavities $k$ shown in Figs. 5 to 8, differ from those shown in Figs. 1 to 4 in having the respective forms of an ordinary gear tooth and a complementary cavity in mesh therewith, the width of cavity $k$ being made slightly greater than the thickness of the tooth it is designed to receive.

When the various parts are thus constructed and properly assembled a vehicle wheel is obtained which fulfils requirements in all respects, that is to say the wheel is provided with very efficient traction means which can be easily and quickly removed from the wheel.

By fixing the blocks on the external surface of the rim, it is possible to locate the pins $b'$ and $b^2$ for the suspension of the shoes at a greater distance from the axis of the wheel than the radius of the rolling surface of the wheel itself.

It is only by the said location of the pins that suspension holes can be formed in the flanges of the shoes with such an outline that the pin can constantly bear against the wall of the hole during the rolling of the wheel without sliding on the surface of the shoes, thus reducing to a minimum wear and losses in rolling characteristics of other known arrangements of this character.

Moreover, the above described devices may be easily applied to all kinds of wheels without necessitating a special construction of the wheel; they may be applied to or removed from the wheel easily and rapidly, so that they are very advantageous in the case of certain vehicles, such for instance as agricultural tractors.

As has been already stated, the invention is not limited in any way to those methods of construction or to those applications which have been more specifically indicated; it includes on the contrary all modifications falling within a fair interpretation of the claims.

What I claim and desire to secure by Letters Patent of the United States of America is:—

1. A traction device for application to metallic rims of vehicle wheels, comprising a wheel, a tooth shaped block rigidly secured to said wheel, said block also having a pin projecting from each of its ends, a traction shoe having a pair of parallel flanges spaced apart a distance greater than the length of said block, said flanges having elongated holes in which the pins of said block work, said holes having outlines partly in the form of cycloidal curves, said shoe having in its rear face a cavity shaped so as to mesh with said tooth shaped block in the relation of a rack and a pinion.

2. A traction device for application to the tread surface of the metallic rim of a vehicle wheel, comprising a pair of flanges, members longer than the width of the wheel rim connecting said flanges adjacent their ends, each of said flanges having between its ends a part extending substantially at a right angle to said flange and directed toward the corresponding part of the opposite flange, each of the latter parts of said flanges having a tooth shaped cavity in its inner face, and each of said flanges having an elongated slot substantially in alignment with the tooth shaped cavity in its angular part and of which the longer dimensions are in the form of cycloidal curves, and a suspension block having on its rear face means for rigidly securing it to the tread surface of a wheel rim, and having its front face adjacent its ends shaped substantially correspondingly to the tooth shaped cavities in the angular parts of said flanges and adapted to mesh with said tooth shaped cavities, said block further having a pin extending from each of its ends into the slot of one of said flanges.

3. A device of the class described comprising in combination a wheel the felly of which is provided with a plurality of teeth, the teeth of said wheel carrying suspension pins and a plurality of shoes having cavities therein shaped to mesh with the teeth of said wheel, said shoes carrying suspending flanges traversed by holes partly cycloidal in outline.

4. A device of the class described comprising a wheel, tooth-shaped blocks each rigidly attached to the felly of said wheel and carrying suspension pins at their extremities, and ground gripping means having cavities meshing with each of said tooth-shaped blocks and loosely suspended from said suspension pins, each of said ground gripping means including means for guiding the movement of said pins relatively to said gripping means in partly cycloidal paths.

5. A device of the class described comprising in combination a wheel, a ground gripping shoe, and means attached rigidly to the felly of the wheel for guiding the movement of the lowermost points of the wheel relatively to said shoe in partially cycloidal paths and simultaneously in paths corresponding to the relative movement of an intermeshing pinion and rack.

In testimony whereof I have hereunto set my hand.

CARLO PASSEGA.